United States Patent [19]

Muskovac et al.

[11] 4,048,520
[45] Sept. 13, 1977

[54] THREE-PHASE SCR DRIVE CIRCUIT USING AN OPTO-COUPLED PULSE AMPLIFIER

[75] Inventors: Nicholas G. Muskovac, Rockville, Md.; Bruce I. Formhals, Norwood, Mass.

[73] Assignee: Vectrol, Inc., Rockville, Md.

[21] Appl. No.: 689,261

[22] Filed: May 24, 1976

[51] Int. Cl.² .................. H03K 17/72; H03K 1/12
[52] U.S. Cl. .................. 307/252 Q; 307/262; 307/311; 323/21; 323/22 SC; 323/34
[58] Field of Search .......... 307/252 N, 252 P, 252 Q, 307/252 W, 311, 262; 323/22 SC, 21, 34

[56] References Cited
U.S. PATENT DOCUMENTS
3,524,986    8/1970    Harnden, Jr. ................. 250/211 J Primary Examiner—John Zazworsky
Attorney, Agent, or Firm—Morris Liss

[57] ABSTRACT

A three-phase shift network includes a single transistor which controls phase shift by introducing a variable resistance into the network as determined by a D.C. control signal supplied to the transistor. The three-phase signals generated from the phase shift network undergo pulse shaping and are subsequently introduced into an opto-coupled pulse amplifier. The amplifier drives large SCR devices, connected as a load.

6 Claims, 3 Drawing Figures

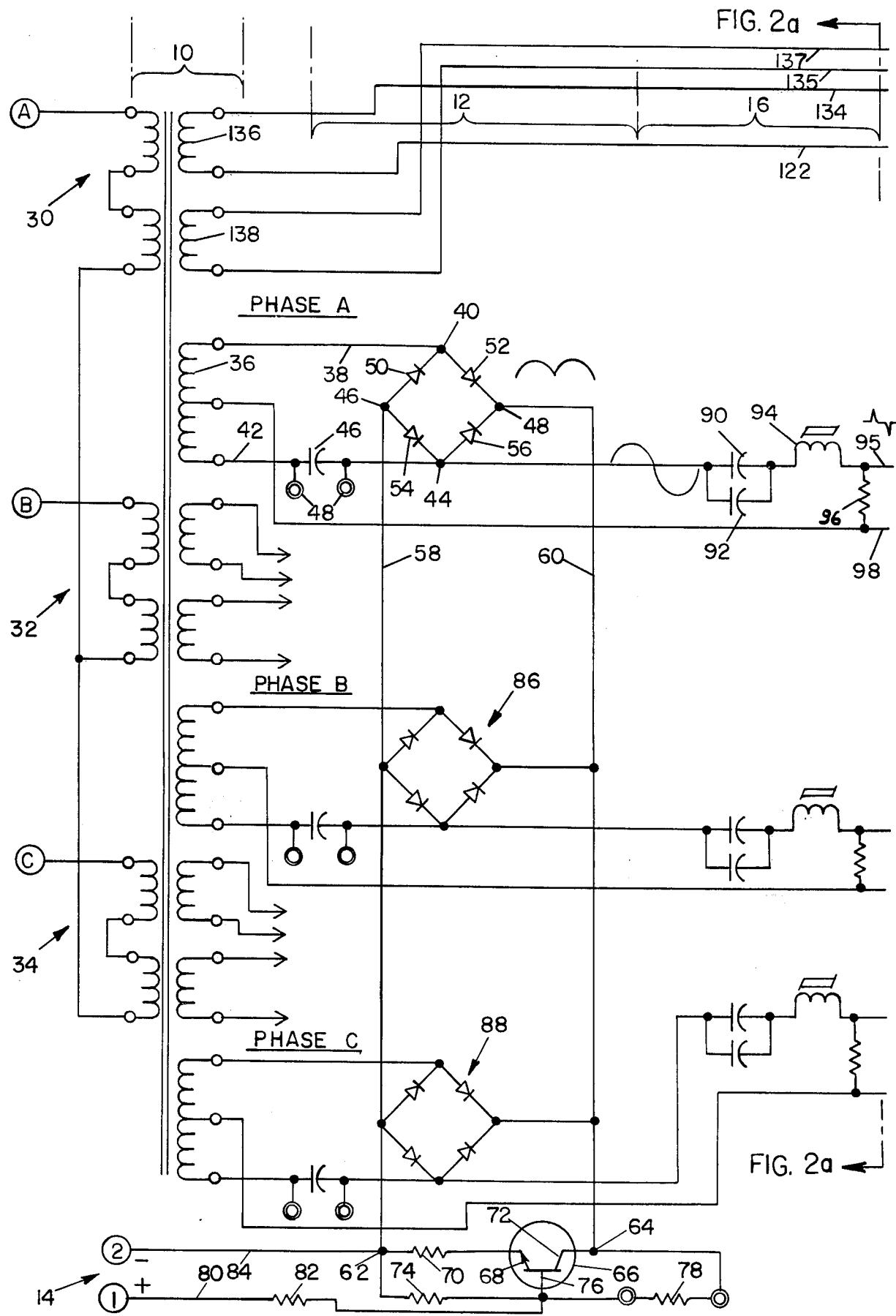

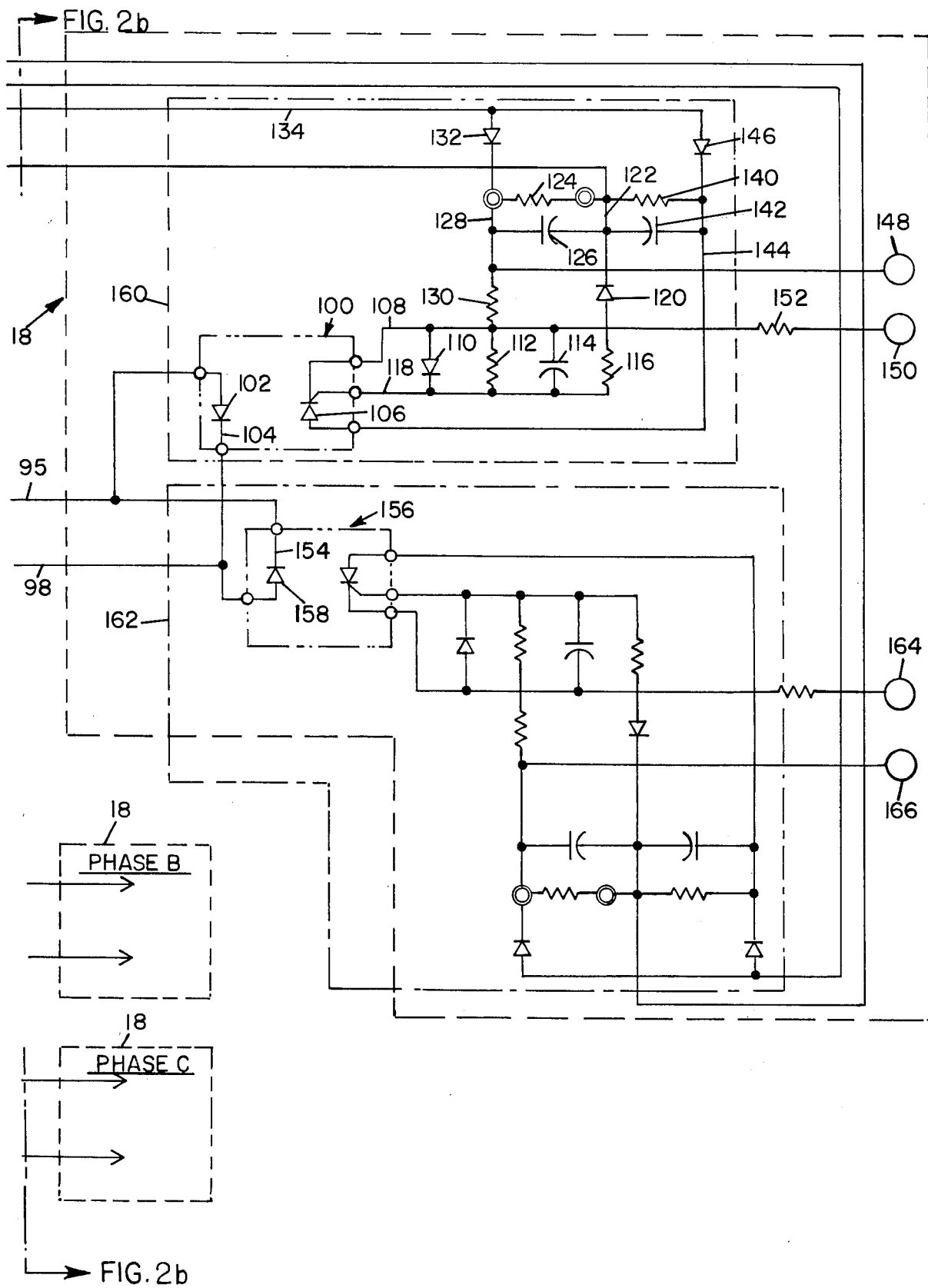

THREE-PHASE SCR DRIVE CIRCUIT USING AN OPTO-COUPLED PULSE AMPLIFIER

FIELD OF THE INVENTION

The present invention relates to SCR control circuits and more particularly to such a circuit adapted for three-phase operation.

BRIEF DESCRIPTION OF THE PRIOR ART

The necessity for controlling the phase for firing SCR's has long been recognized. For example, in U.S. Pat. No. 3,316,427, issued to Muskovac, a phase shifter circuit is disclosed. This circuit contains a variable resistance and a capacitance so as to be capable of shifting the phase of the output voltage relative to the input voltage while maintaining the output voltage at a substantially constant magnitude. The prior invention related to a phase shift network in which the capacitance is kept constant and the resistance element is a transistor that exhibits a variable resistance. The purpose of such a phase shift network is to vary the phase between the output voltage and the input voltage so that one either leads or lags the other. One use of such a phase shifting network is to provide a gate firing voltage for a silicon controlled rectifier, hereafter referred to as an SCR, which may be varied with respect to the time of application of the SCR anode voltage. To assist this control of the SCR firing time, it is desirable to provide a variable resistance element which can in effect be varied in range from infinity to zero, so that the shift of the phase angle can be effected through a full 180°. Although the approach of the prior art operates satisfactorily, it was previously customary to include a separate transistor for each of the phase shift circuits. As will be appreciated, this adds expense to the network as well as decreasing the inherent reliability thereof.

In instances where high power SCR's are to be driven, it is customary to employ low power SCR's to fire them. For example, in U.S. Pat. No. 3,337,753 to Muskovac, such a circuit is disclosed. It includes a wave forming means which produces a positive anode-to-cathode bias of substantially constant magnitude on the low power SCR during a half cycle of applied alternating current and low negative gate-to-cathode bias on the high power SCR such that upon triggering of the low power SCR, its pulse, which is of substantially constant magnitude, overcomes the negative gate bias, thereby producing a firing pulse having a fast rise time for the high power SCR. Pulse forming gate circuits as disclosed in this mentioned patent sometimes exhibit problems due to a lack of signal isolation between the low power SCR and circuits preceding it. As a result, inadvertent firing of the main SCR may result which is undesirable.

BRIEF DESCRIPTION OF THE PRESENT INVENTION

The phase shifting portion of the present invention utilizes a single transistor for all three phases of a phase shift network. By using a single transistor, matching problems are not encountered as would be the case with three separate phase shifting networks employing three transistors. Further, precision resistors are not required in the network as would be the case if three single phase phase shifters were employed. As a result of fewer components, the present invention realizes lower costs and greater reliability. Further, there is better long term stability. Further, there is no danger of a matching error due to aging of transistors or due to ambient temperature variations, since only one transistor is required.

The second major feature of the invention is to include an opto-coupled SCR in an opto-coupled pulse amplifier. The transmission of energy through an opto-coupled SCR renders high isolation at this point in the system. As a result, there is less likelihood of inadvertent firings of high power SCR's, as previously mentioned in connection with the prior art. Another major advantage is the opto-coupled SCR is much smaller in size than the pulse transformer and low power SCR that it replaces.

BRIEF DESCRIPTION OF THE FIGURES

The above-mentioned objects and advantages of the present invention will be more clearly understood when considered in conjunction with the accompanying drawings, in which:

FIG. 2a is a partial schematic diagram of the present invention including the input end of the inventive circuitry.

FIG. 2b is a partial schematic diagram of the output end of the inventive circuitry to be connected with the input portion of FIG. 2a.

DETAILED DESCRIPTION OF THE INVENTION

Figure 1:
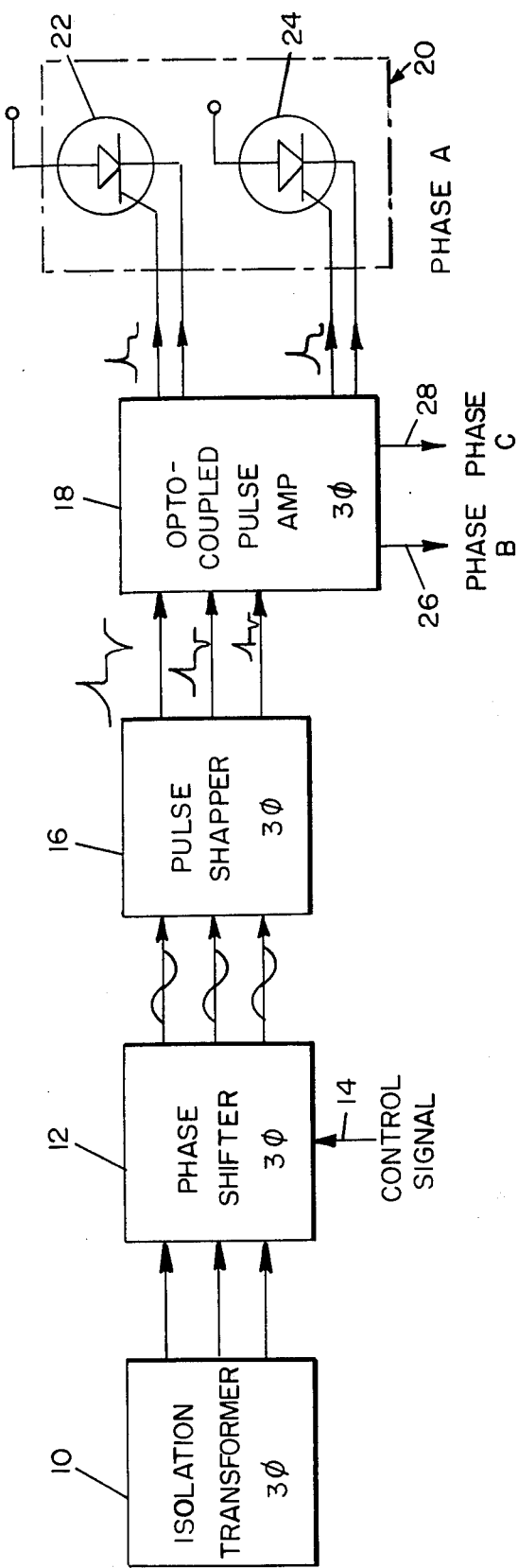
FIG. 1 is an electrical block diagram of the present invention.

Referring to the figures and more particularly FIG. 1 thereof, the present invention includes a three-phase isolation transformer 10 for stepping down line voltage. A phase shifter 12 is connected to the output of the isolation transformer, for each phase thereof, and serves to shift each phase as determined by a control signal which is a D.C. signal applied at 14. A three-phase pulse shaper 16 is driven by the output from the phase shifter 12 and converts the sinusoidal signals from the phase shifter 12 to respective pulse signals. An opto-coupled pulse amplifier 18 has three phase inputs respectively connected to the pulse shaper 16. The pulse signals derived from the shaper 16 trigger low power SCR's associated with the pulse amplifier 18. The low power SCR's are opto-coupled and produce amplified trigger pulses for high power load SCR's such as 22 and 24, which constitutes one of the phases 20 which is further indicated as Phase A. The pulse amplifier 18 has additional phase outputs at 26 and 28, each of these phase outputs being utilized to drive additional high power SCR's such as 22 and 24.

Referring to FIG. 2a which shows the input portion of the circuitry blocked out in FIG. 1, the blocks 10, 12 and 16 are generally indicated and will be explained. The three-phase isolation transformer 10 includes individual transformer sections 30, 32 and 34 corresponding with Phase A, Phase B and Phase C, respectively. The transformer section for each phase includes dual section primary and secondary windings as illustrated. The three-phase isolation transformer may be of a conventional wye configuration. The phase shifting section of the overall circuitry is generally indicated by reference numeral 12. This is seen to include a secondary winding 36, associated with Phase A. Such a transformer secondary winding and connected circuitry to accomplish phase shift is included with each of the two remaining Phases B and C as illustrated. For purposes of convenience, only the phase shifting circuitry in connection with Phase A will be discussed. The upper terminal of the winding 36 is connected along lead 38 to the top junction 40 of a diode full wave rectifier bridge. The lower terminal of the winding 36 is connected via lead 42 to a lower junction 44 of the diode bridge. However, an intermediately connected parallel configuration is present between the lower terminal of winding 36 and the junction 44. The parallel configuration includes a capacitor 46 and a connector for a capacitor pad not shown which is connected between the connectors 48 during assembly and test of the circuitry. The diodes 50, 52, 54 and 56 are connected in a conventional fashion to achieve the full wave rectification of a sinusoidal signal appearing at the secondary winding 36.

As previously discussed, a feature of the present invention is the utilization of a single transistor as a variable resistor, connected in parallel with the other diode bridges 86 and 88 respectively associated with Phase B and Phase C. To achieve this, lead 58 is connected at its upper terminal to junction 46 of the Phase A diode bridge and similar junctions of the diode bridges 86 and 88. Likewise, a lead 60 is connected at its upper end to the junction 48 and similarly situated junctions of diode bridges 86 and 88. The lower end of lead 58 is connected to the emitter 68 of an NPN transistor 66, through an emitter resistor 70. The terminal 62 has the negative potential of a D.C. control signal applied thereto, along lead 84. The control signal is generally indicated by reference numeral 14 and corresponds to the illustrated control signal input in FIG. 1. The positive potential of the control signal is applied to the base terminal 76 of the transistor 66 through a base resistor 82, via lead 80. Emitter-base bias is completed by connecting resistor 74 between the lead 84 and the base 76. A collector-to-base bias resistor 78 is connected between the junction 64, at collector 72, and the base 76. The transistor 66 operates as a Class "A" amplifier and functions as a variable resistor for all three diode bridges. The phase shift is controlled by the D.C. control signal at 14.

Again considering Phase A, the sinusoidal signal from junction 44 of the uppermost diode bridge undergoes pulse shaping by the circuitry which follows the bridge and generally indicated by reference numeral 16. This pulse shaping circuitry includes RLC components. These include parallel connected capacitor components 90 and 92, together connected in series with the junction 44. An inductor 94 is also connected in series with the parallel capacitor combination. The parallel capacitor combination could be a single capacitor. A load resistor 96 is connected between the output terminal of the inductor 94 and lead 98 that is connected to the center tap of the winding 36. The output signal across resistor 96 is fed to the input of the opto-coupled pulse amplifier generally indicated by reference numeral 18 in FIG. 2b. The signal developed across the load resistor 96 is a narrow pulse signal that is capable of triggering the opto-coupled pulse amplifier 18.

With reference to FIG. 2b, the circuitry in connection with the pulse amplifier for Phase A will be explained. Each phase output from the opto-coupled pulse amplifier drives two different high power SCR's. Only a single section of pulse amplifier circuitry, such as 160 will be explained since it drives its particular high power level SCR in a similar manner to identical circuitry 162 which drives a second high power level SCR associated with the same Phase A. The trigger signal from the pulse shaper load resistor 96 is applied to an opto-coupled SCR 100 which is a conventional device such as manufactured by General Electric and denoted as an H11C1 device. Essentially, such a device includes a light emitting diode, hereafter referred to as an LED, having its anode 102 connected to the upper terminal of the load resistor 96. The cathode 104 is connected to the lower terminal of the load resistor 96. Upon the application of a triggering pulse, light energy is transmitted from the LED to a light sensitive low power SCR 106. The circuitry connected to the low power level SCR is similar in design and intent to that disclosed in the previously mentioned U.S. Pat. No. 3,337,753. That is, the low power SCR is utilized as a pulse amplifier to trigger a high power SCR at the output of the entire circuitry. The parallel connected diode 110, resistor 112, and capacitor 114 are connected between the cathode and gate of the low power SCR 106. The cathode lead 108 of the SCR 106 is connected to the anode of diode 110 while the gate of the SCR 106 is connected along lead 118 to the cathode of diode 110. The connection of the diode 110 as shown limits the voltage in the cathode-gate direction of the SCR 106. The resistor 112 provides a quiescent bias for the SCR 106 while the capacitor 114 provides a low A.C. impedance bias. Furthermore, the resistor 112 and capacitor 114 act as transient suppressors for the SCR 106. The lower terminal of a resistor 116 is connected to the gate terminal of SCR 106, via lead 118. The upper terminal of resistor 116 is connected to the anode of a diode 120. The cathode of the diode 120 is connected at 122 to the right terminal of parallel connected resistor 124 and capacitor 126. The opposite terminals of the resistor 124 and capacitor 126 are connected along lead 128 to the upper terminal of resistor 130. The lower terminal of resistor 130 is connected to lead 108 which in turn is connected to the cathode of the SCR 106. The cathode of another diode 132 is directly connected to the lead 128 while the anode of diode 132 is connected along lead 134 to the upper terminal of winding 136. The components 132, 130, 110, 116, and 120 create a current path to bias the low power SCR 106 in a manner preventing erroneous firing due to line noise. The upper terminal of secondary winding 136 is also connected to the anode of a diode 146 along lead 134 while the cathode of diode 146 is connected to lead 144. This latter-mentioned lead interconnects the right terminals of resistor 140 and capacitor 142. Opposite ends of the resistor 140 and capacitor 142 are connected in parallel with the cathode of diode 120.

Current will flow through both diodes 132 and 146 during a first half-cycle of applied voltage with the current through diode 132 and resistor 124 bucking that through diode 146 and capacitor 142, to form a pulsating voltage. The capacitor 126, which bypasses resistor 124, and is employed as a low impendance means to shunt the output pulse of SCR 106 past resistor 124, does not effect any wave forming means, since it is small in comparison to capacitor 142 and does not retain a charge.

A substantially constant voltage is due to the retained charge of capacitor 142 during the second half-cycle of applied alternating current; a slight loss in voltage during this half-cycle being provided by the capacitor 142 and parallel connected bleeder resistor 140. The bleeding of capacitor 142 results in a slight drop in voltage which ensures a negative swing during a following half-cycle. The cathode terminal 148 for a first high power level SCR such as 22 in FIG. 1 is directly connected to the top terminal of resistor 130. The gate terminal 150 for such a high power SCR is connected through a current limiting resistor 152 to the cathode of the low level SCR 106 via lead 108. The gate terminal 150 furnishes a positive SCR pulse for a high level SCR.

A network 162 such as the just described circuit network 160 is provided for a second high level SCR such as 24 in FIG. 1. As shown, a second opto-coupled SCR device 156, such as the first illustrated device 100, has the cathode 154 of a contained LED connected to the upper terminal of the load resistor 96 (FIG. 2a) while the anode 158 of the LED is connected to the lower terminal of the load resistor 96. As a result, the gate terminal 164 provides triggering pulses for a second high power SCR. The cathode terminal 166 for such an SCR is connected to circuit components in an identical manner to that previously discussed in connection with the network 160. It is to be understood that the mentioned high power level SCR devices, such as 22 and 24 in FIG. 1 are load devices which are not, per se, part of the present invention.

Each of the remaining Phases B and C likewise have opto-coupled pulse amplifiers such as 18. Therefore, further explanation of their circuit structure and operation is unnecessary. However, it is mentioned that each of these remaining Phases B and C are capable of driving two high level SCR loads for each of the remaining phases so that a total of six high power level SCR devices may be driven by the entire circuitry shown in FIG. 2b.

It should be understood that the invention is not limited to the exact details of construction shown and described herein for obvious modifications will occur to persons skilled in the art.

We claim the following:

1. An SCR drive circuit comprising:
  a plurality of means for selectively shifting each phase of multiple phase electrical signals;
  respective means each having an output and connected in circuit with an output of each phase shifting means for shaping each of the phase shifted signals; and
  respective opto-coupled means connected in circuit with an output of a respective shaping means for generating trigger signals for firing SCR devices connected as loads to respective opto-coupled means;
  respective means connected between an input of each phase shifting means and power lines for isolating the respective phase shifting means from direct connection to the power lines.

2. The subject matter set forth in claim 1 wherein each phase shifting means includes an individual diode rectifier bridge for full wave rectification of a particular phase signal present at an input of the bridge; and
  a single variable resistive means connected to the bridges associated with all phases for controlling the amount of phase shift.

3. The subject matter set forth in claim 1 wherein the isolating means is a multiple phase isolation transformer.

4. The subject matter set forth in claim 2 wherein the variable resistive means is a transistor operating in a Class "A" mode.

5. The subject matter set forth in claim 4 together with variable D.C. bias means connected to the transistor for controlling the resistivity which the transistor introduces to the bridges.

6. A phase shifting network for multiple phase operation comprising:
  a plurality of rectifier diode bridges, each bridge having:
    first and second terminals connected to a source of A.C. power;
    third and fourth terminals respectively connected to an emitter and a collector of a common transistor;
  means for introducing a variable D.C. bias to a base of the transistor for varying the resistivity imposed by the transistor on all of the bridges; and
  connecting means connected to the second terminal and a preselected potential point of the power source for making available thereat a signal that is phase shifted relative to the remaining diode bridges.

* * * * *